United States Patent [19]
Zinck

[11] Patent Number: 4,658,738
[45] Date of Patent: Apr. 21, 1987

[54] APPARATUS AND PROCESS FOR TREATING SOIL USED FOR CULTIVATION

[76] Inventor: Eugen Zinck, Hueffelsheimer Strasse 2, 6550 Bad Kreuznach, Fed. Rep. of Germany

[21] Appl. No.: 792,102

[22] Filed: Oct. 28, 1985

[30] Foreign Application Priority Data

Oct. 27, 1984 [DE] Fed. Rep. of Germany ....... 3439380
Aug. 17, 1985 [DE] Fed. Rep. of Germany ....... 3529551

[51] Int. Cl.⁴ ............................................. A01C 21/00
[52] U.S. Cl. .................................................. 111/7.2
[58] Field of Search ........................... 111/6, 7.1–7.4, 111/7

[56] References Cited

U.S. PATENT DOCUMENTS

| | | | |
|---|---|---|---|
| 1,755,445 | 4/1930 | Irish | 111/7.1 |
| 1,814,445 | 7/1931 | Irish | 111/7.1 |
| 1,814,446 | 7/1931 | Irish | 111/7.1 |
| 2,306,165 | 12/1942 | Irish | 111/7.1 |
| 3,450,073 | 6/1969 | Baker | 111/6 |
| 3,521,819 | 7/1970 | Johnston | 111/6 |
| 3,875,876 | 4/1975 | Pustovoit et al. | 111/6 |
| 4,429,647 | 2/1984 | Zinck | 111/6 |
| 4,566,543 | 1/1986 | Kotani | 111/6 |
| 4,570,553 | 2/1986 | Ito | 111/6 |

FOREIGN PATENT DOCUMENTS

| | | | |
|---|---|---|---|
| 2716456 | 8/1978 | Fed. Rep. of Germany | 111/7.4 |
| 3344785 | 6/1985 | Fed. Rep. of Germany | 111/7.4 |
| 274132 | 6/1951 | Switzerland | 111/7.4 |
| 356300 | 9/1961 | Switzerland | 111/6 |

*Primary Examiner*—James R. Feyrer
*Attorney, Agent, or Firm*—Schwartz, Jeffery, Schwaab, Mack, Blumenthal & Evans

[57] ABSTRACT

Apparatus and method for breaking up soil and introducing a substrate into the broken up soil. The substrate is contained in a reservoir. A series of pneumatic cylinders acting in timed sequence function to first open a rapid-closing valve for introducing a blast of compressed air for forcing a probe into the ground for breaking up the soil. The rapid-closing valve is then closed, a pressure drop sensed, and an injection valve opened to pressurize the reservoir to inject substrate into the fissures formed during the break up of the soil. The substrate may comprise fertilizers, curing substances or filling materials which, together with the compressed air with which they are injected, serve to better condition the soil for cultivation. If desired, additional compressed air lines may communicate with the interior of the reservoir for ensuring a positive pressure in the reservoir to carry out substrate injection.

22 Claims, 6 Drawing Figures

APPARATUS AND PROCESS FOR TREATING SOIL USED FOR CULTIVATION

BACKGROUND OF THE INVENTION

The present invention relates to an apparatus and process for breaking up soil used for the cultivation of plants.

In an apparatus of this type, breaking up agriculturally utilized soil is effected by means of a probe, whereby by means of a rapid-closing gate valve and an injection valve compressed air and a substrate, respectively, are driven suddenly into the soil. The rapid-closing gate valve is located in an upper and the injection valve in a lower area of an intermediate reservoir containing substrate. The rapid-closing valve is followed by an injector pipe. When the rapid-closing valve is in an open position, the injector pipe is raised from an injection valve seat of the intermediate reservoir to open the injection valve. The rapid-closing valve, in order to be opened and closed, is connected with the piston of a first pneumatic cylinder and the injector pipe and with the piston of a second pneumatic cylinder by means of a tie rod. In order to produce a periodic release of the injector valve, the pressure action in the injector pipe is connected with a third dynamic pressure chamber of the compressed air cylinder limited by the piston. Control pressure lines are connected with both pneumatic cylinders.

In practical applications of the apparatus it is necessary to maintain the injection valve closed with great force and closed as tightly as possible until the injection valve is opened. It is also necessary that the opening of the injection valve take place exactly following the breaking up of the soil. When the injection valve is open, the propping substrate should enter the air flow coming from the injector pipe without clogging or the like, and as free of interference as possible. After the injection of the substrate into the soil, the injection valve should be closed by the dynamic pressure in the shortest time possible.

SUMMARY OF THE INVENTION

It is an object of the present invention to further develop an apparatus of the above-described type and a process using the apparatus and adapted to heterogeneous soil conditions. It is an object to increase the sensitivity of the pressure dependent control functions in order to obtain optimum process behavior. Particularly, the time difference between the opening of the rapid-closing gate valve and the injection valve should be determined accurately, in view of their separate functions.

This object is attained with an apparatus and with a process using the apparatus according to the present invention.

It has been found that, following opening of the injection valve, a pressure of between 2 and 3 bars is generated in the injection chamber, in spite of the high velocity of the air flow. During the time in which this counter pressure is developed, no substrate can come in contact with the flow of air and therefore cannot be entrained by it. This is not entirely satisfactory because, shortly after the injection valve is opened the maximum velocity of the air at the corresponding residual pressure provides the air flow with its maximum transport capacity. At the same instant, the crevices, cracks and pores of the soil are widened to their maximum extent. The propping substrate may be entrained by the air flow and injected by the probe into soil broken up by the impact of a preceding air blast only following the equalization of the pressure between the reservoir and the air jet. At this time, however, the air pressure has been reduced significantly, so that the velocity of the air has also been reduced and the injection of rendered substrate less than optimal.

A further object of the present invention consists of developing an apparatus so that optimum penetration and propping of the broken soil volume is achieved, preferably with a high air pressure and particularly with a high air velocity.

Further objects, features, and advantages of the present invention will become apparent from the brief description of the preferred embodiments which follows, when considered together with the attached drawings.

DETAILED DESCRIPTION OF THE PREFERRED EMBODIMENTS

Figure 1:
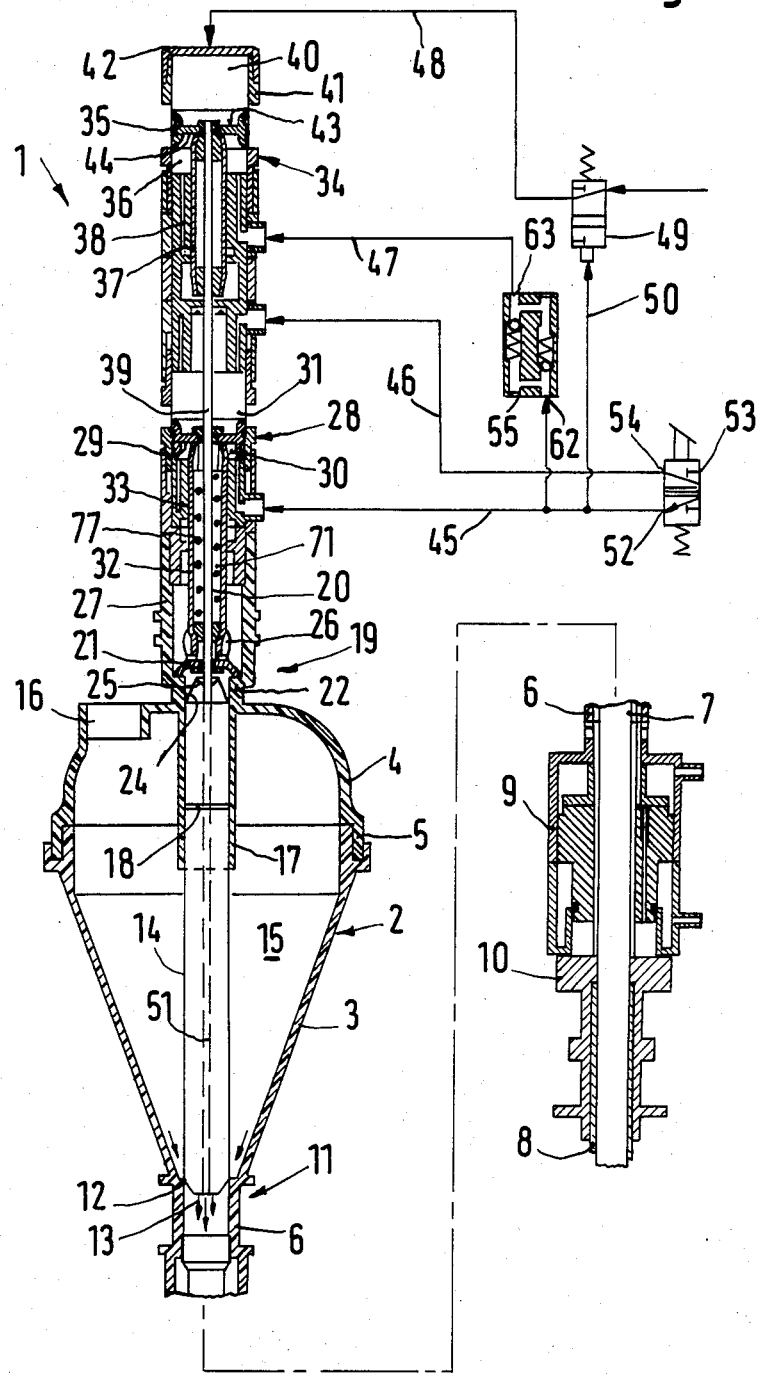
FIG. 1 shows a partially sectioned lateral view of an apparatus according to the invention, with the figure being extended and laterally offset as indicated to show the ram and the probe.

The apparatus 1 according to the invention shown in FIG. 1 is intended for breaking up soil used for the cultivation of plants. Compressed air produced by a compressor is injected suddenly at a depth of approximately 50–90 cm in the form of an eruptive blast. In this manner the soil is broken up or loosened within defined areas and, more particularly, made permeable in structurally predetermined fracture lines, so that the soil structure is not damaged as in conventional ploughing. By means of apparatus 1, the fine canals produced in the soil may be supported with propping materials immediately following the blast. In addition to the propping materials, fertilizers or curing substances may be introduced into the canals of the loosened area by means of compressed air. In view of the simultaneous introduction of oxygen an optimum preparation of the soil is obtained.

The apparatus 1 comprises an intermediate funnel-shaped reservoir 2 made of a transparent synthetic plastic or a metal, and including a bottom part 3 and an upper part 4. The bottom part 3 and the upper part 4 are screwed together by means of threads 5. A mounting fitting 6 is provided on the bottom part 3 of the intermediate reservoir 2. An inner tube 7, which rotates about its axis, is located in the fitting 6. The inner tube 7 is associated with a probe tube 8 for insertion in the ground. The apparatus 1 has a ram 9 operated with compressed air, and an anvil 10 for forcing the probe tube 8 into the ground.

An injection valve 11 is provided in a tapered end of the bottom part 3 of the reservoir 2. The valve 11 comprises an injector valve seat 12 of the bottom part 3 and a conical, jet-like compressed air outlet 13 of an injector pipe 14. The pipe passes through the inner space 15 and the central axis of the intermediate reservoir 2. The reservoir 2 is where the substrate to be introduced into the soil is stored.

A relief valve 16 is located on the upper part 4 of the intermediate reservoir 2. A tubular sleeve 17 is also arranged on the upper part 4, which projects into the inner space 15, and wherein the injector tube 14 is supported in an axially displaced manner and sealed by means of an annular gasket 18.

Coaxially with the longitudinal axis of the intermediate reservoir 2, a rapid closing valve 19 is located on the upper wall of the reservoir. The valve comprises a valve cone 21 seated on a valve seat 22. A tie rod 20 passes through the rapid closing valve 19. The open upper end 24 of the injector tube 14 is fastened with a screw nut 25 at the lower end of the tie rod 20. Fine adjustment of the exact sealing function of the injection valve 11 may be obtained by means of the screw nut 25.

An orifice 26 of the connecting fitting for the compressed air supplied by the compressor is provided, directly above the valve cone 21, in a wall of the housing of the rapid closing valve 19.

A pneumatic cylinder, for the sake of clarity pneumatic cylinder 28, is screwed onto the tubular valve housing 27 of the rapid-closing valve. A piston 29 is axially displaceably guided in the cylinder 28. A pressure chamber 30 is located under the piston 29, while a counter pressure chamber 31 is disposed above the piston 29. A downwardly extending tubular piston rod 32 is arranged on the piston 29. The piston rod 32 is guided tightly in a sleeve 33. The valve cone 21 of the rapid closing valve 19 is fastened to the lower end of the piston rod 32.

Another pneumatic or compressed air cylinder 34 is screwed on top of the pneumatic cylinder 28, and lies on a projection of the central long axis of the reservoir 2. Compressed air cylinder 34 is generally similar in configuration to the pneumatic cylinder 28. A piston 35 is axially displaceably guided in cylinder 34. The piston 35 limits in the downward direction a working chamber 36 and includes a downwardly directed piston tube 37.

The piston tube 37 is supported tightly in a sleeve 38 and has no stroke function but performs merely guiding and sealing roles.

The tightly guided tie rod 20 is mounted at the upper end of the piston tube 37. The tie rod 20 comprises an air conduit 39 in the form of a continuous, longitudinal bore, such that a free air passage exists through the piston 35 to a dynamic pressure chamber 40 located above it. The tie rod 20 is screwed at its upper end with the piston tube 37. The piston tube 37 is in turn screwed together with the piston 35 by means of a protruding screw end. The housing 41 of the compressed air cylinder 34 is closed off on top by a screw cap 42. The piston 35 comprises a dynamic pressure surface 43 on top which acts in the downward direction. The piston 35 also has working surface 44 on the bottom which acts in the upward direction. The surface 44 is smaller by the diameter of the piston tube 37 than the dynamic pressure surface 43.

A control pressure line 45 is connected to pneumatic cylinder 28 at the lower pressure chamber 30; and a further control pressure line 46 is connected with the pneumatic cylinder 28 at the upper counter pressure chamber 31. In addition, a control pressure line 47 is provided on the compressed air cylinder 34 at the lower working chamber 36, and a compressed air line 48 is provided at the upper dynamic pressure chamber 40. Control pressure lines 46, 47 communicate with the pressure in the inner tube 7 by means of the air line 39.

A pilot valve 49 is located in the compressed air line 48 leading to the upper dynamic pressure chamber 40. Pilot valve 49 may be actuated by means of a control pressure line 50. FIG. 1 clearly shows that the compressed air line 48, actuable by means of the pilot valve 49, is connected with the top of the compressed air cylinder at the screw cap 42 of the compressed air cylinder. Line 48 opens coaxially with the air line 39 into the dynamic pressure chamber 40 and is directly connected with the air space in the inner tube 7 by means of the air line 39.

It is also clearly seen in FIG. 1 that the air line 39 is extended downward toward the inner tube 7 as a pressure transducer line 51. The air line 39 follows the shortest path, and has an approximately constant cross section from the compressed air outlet 13 of the injector tube 14 along the axis of the intermediate reservoir 2, and through the pressure transducer line 51 and the hollow tie rod 20 to the upper dynamic pressure chamber 40. Specifically, the pressure transducer line 51 has the configuration of a tube. The line 51 is arranged to be an extension of the air line 39 in the injector tube 14. The compressed air conducted through the compressed air line 48 from above into the dynamic pressure chamber 40, is guided through the pressure transducer line 51 separately from the compressed air conducted downward through the rapid closing valve 19 in the injector tube 14, to the compressed air outlet 13 at the injector valve seat 12. Improved sensitivity of the pressure dependent control functions is obtained even if the compressed air conducted through the compressed air line 48 into the dynamic pressure chamber 40 is passed through the air line 39 or pressure transducer line 51 to the upper area of the intermediate reservoir 2. It is, however, particularly advantageous to extend the pressure transducer line as far as possible downward to the probe 8. It may be favorable to pass the pressure transducer line 51 into the inner tube 7 or to permit it to project into the tube 7.

The control pressure line 45 leading to the lower pressure chamber 30 of the pneumatic cylinder 28 is connected with an outlet 52 of a 5/2 distributing valve 53. The control pressure line 47 leading to the lower working chamber 36 of the compressed air cylinder 34 and the control pressure line 50 leading to the pilot valve 49 branch off the control pressure line 45 and are therefore also connected with the outlet 52 of the 5/2 distributing valve 53. The control pressure line 46 leading to the upper counter pressure chamber 31 of the pneumatic cylinder 28 is connected with a another outlet 54 of the 5/2 distributing valve 53. The valve 53 thus has five connections and two switching positions.

Figure 2:
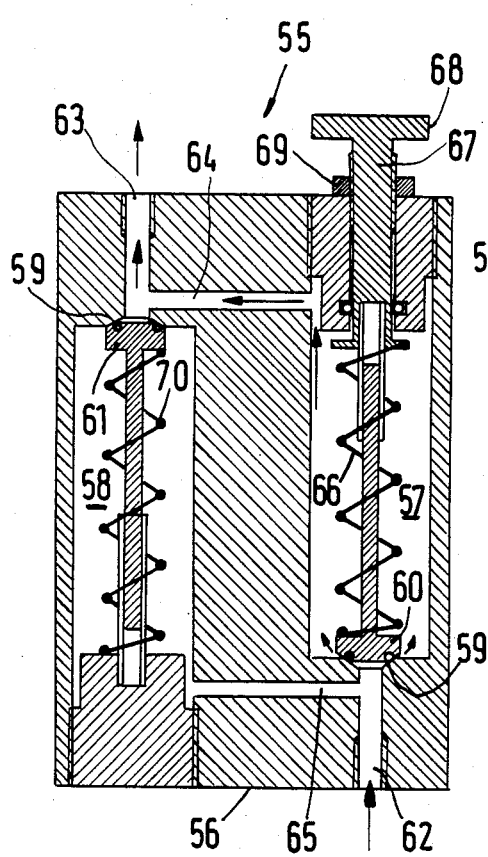
FIG. 2 is an enlarged sectional view of the time valve for one of the working chambers of the apparatus according to FIG. 1.
Figure 3:
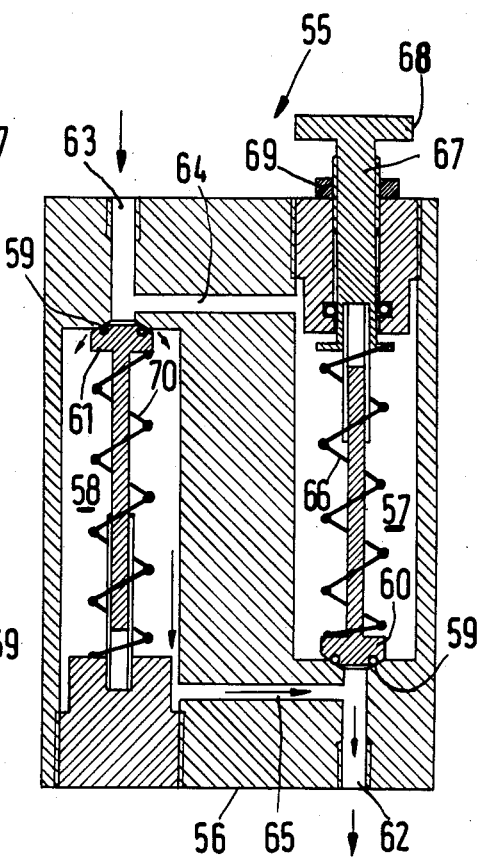
FIG. 3 shows the time valve in a partially-sectioned lateral view according to FIG. 2, but in the opposite functional position.

A time valve 55, the details of which are shown in FIGS. 2 and 3, is located in the control pressure line 47 leading to the lower working chamber 36 of the compressed air cylinder 34. The time valve 55 is accurately adjustable and serves to provide individual adaptation to differential soil conditions in order to attain a pressure buildup in the lower pressure chamber 36 of the compressed air cylinder 34 which is optimally timed. As seen in particular in FIG. 2 and 3, the time valve 55 has a housing 56 containing two parallel chambers 57, 58 each having a valve seat 59 at the respective ends thereof. A valve body 60 is located in the chamber 57, while a valve part 61 is placed in the other chamber 58. The valve body 60 and the valve part 61 have the same approximate configuration and are guided in an axially displaceable manner, but are arranged in opposite directions. The valve body 60 is coordinated with the valve seat 59 provided at the inlet 62 of the time valve 55, while the valve part 61 is coordinated with the valve seat 59 provided at the outlet 63 of the time valve 55. A connecting channel 64 for air supply is located between the outlet 63 and the chamber 57. A transverse channel 65 leading from the chamber 58 to the inlet 62 is provided in the housing 56 for the return flow of air. A helical spring 66 for biasing the valve body 60 against the valve seat 59 of the inlet 62 is associated with the valve body 60. The spring 66 is supported opposite to the valve seat 59 on an adjusting screw 67. The screw 67 has a knurled head 68 for manual rotation so that the force of the spring 66 may be finely adjusted. The adjusting screw 67 may be locked by means of a counter nut 69. The valve part 61 located in the chamber 58 is associated with a helical spring element 70. The force of the spring element 70 is only large enough to enable the valve body to perform its intended checking function, to ensure that there is no delay in the relief of the working chamber 36 of the compressed air cylinder 34, and to ensure that the lowest possible residual pressure is generated.

The force of the spring 66 may be adjusted conveniently so that the valve body 60 is lifted from the valve seat 59 of the inlet 62 within a range of from about 0.5 to 8 bar. The pressure and velocity of the air supply at outlet 63 from the time valve 55 for the opening of the injection valve 11 may thus be accurately determined.

The time valve 55 thus makes it possible to affect the time of the pressure buildup in the working chamber 36 and thereby the magnitude of the pressure. Consequently, the breaking-up process may be accurately adjusted to different soil conditions encountered in actual practice, so that a high capacity of the process is assured.

In the operating position shown in FIG. 3 the compressed air flows back and may be almost completely relieved, i.e. the injection valve 11 is closing. The compressed air therefore escapes through the 5/2 distributing valve 53.

Figure 4:
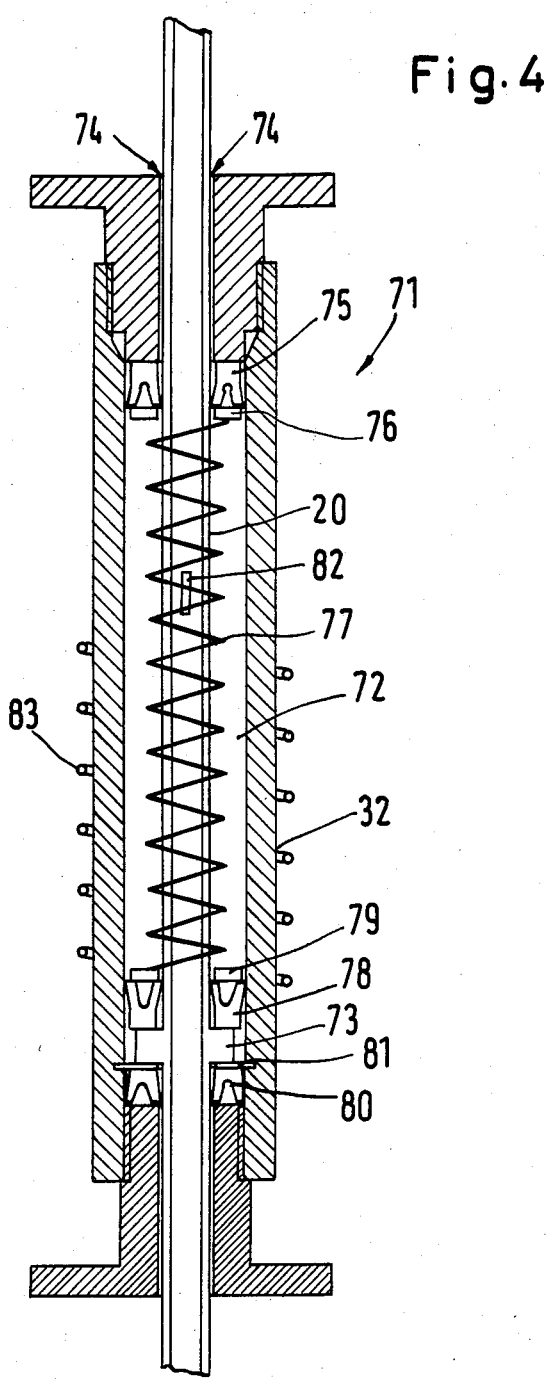
FIG. 4 shows a partially sectioned lateral view of a pneumatic spring integrated into the compressed air cylinder of the apparatus according to FIG. 1.

Referring to FIG. 1 a pneumatic spring 71 is provided for closing the rapid-closing valve 19. The spring 71 is shown enlarged in FIG. 4. The pneumatic spring 71 is supplied with compressed air through the control pressure line 46 connected with the counter pressure chamber 31. A pressure chamber 72, transfixed by the hollow tie rod 20, is formed in the piston rod 32. A piston 73 is mounted on the tie rod 20. An air inlet 74 with a gasket 75 acting as a check valve is located on the upper side of the pneumatic spring 71 facing the counter pressure chamber 31 of the pneumatic cylinder 28. The gasket 75 is located in the pressure chamber 72 of the piston tube 32 and has an approximately V shaped cross section. Two sealing lips of the gasket 75 diverge downwardly, sealing the tie rod 20 on the inside and the pressure chamber 72 on the outside. A support and guide disk 76 is located on the downward-pointing V opening of the gasket 75 which essentially has the configuration of a standard groove ring. One end of a helical holding spring 77 abuts the disk 76. The piston 73 of the pneumatic spring 71 also has a gasket 78 with a V-shaped cross section. The gasket 78 is placed so that the V opening of the diverging sealing lips points upward. Here again, a support disk 79 for the lower end of support spring 77 is provided. An annular gasket 80 is disposed at the bottom of the pressure chamber 72 of the pneumatic spring 71 facing the rapid closing valve 19. Gasket 80 has the same configuration in cross section as the gaskets 75 and 78 and comprises two downward-pointing V shaped divergent sealing lips. The gasket 80 abuts against a support disk 81 mounted on the piston tube 32.

The hollow tie rod 20 has an axial relief canal 82 so disposed that, when the injection valve 11 is open, the tie rod 20 is axially and upwardly displaced so that the relief canal 82 bridges the sealing lip of the gasket 75. The pressure thus escapes through the inlet 74, the counter pressure chamber 31, the control pressure line 46 and the 5/2 distributing valve 53. An additional closing spring 83 for the rapid-closing valve is provided on the piston rod 32 of the pneumatic spring 71.

The holding spring 77 of the pneumatic spring 71 is strong enough to retain the upper gasket 75 while the compressed air is flowing in from above. The closing force of the groove ring is very small, so that the air is able to enter the pressure chamber 72 through the air inlet 74 even at approximately 0.2 bar. The gasket 75 has the function of a check valve. The outer closing spring 83 provides a safe closure at the onset of the compressed air accumulation in front of the rapid closing valve 19.

When the probe is inserted in the soil, the probe pipe 8 is opened initially. An actuating valve for the compressed air source, conventional and not shown, permits the compressed air to be passed through the 5/2 distributing valve 53, thus subsequently pneumatically closing the rapid closing valve 19 and the injection valve 11. The compressed air penetrates through the air inlet 74 and the upper gasket 75 into the pressure chamber 72. The pressure on the piston 73 applies a closing force of a magnitude (20 bar, for example) that otherwise could not be attained with a mechanical spring in view of the tight space conditions and the resulting restricted dimensions.

At the instant the soil is broken up pressure declines in the dynamic pressure chamber 40. The pressure, built up in the working chamber 36 by means of the time valve, now opens the injection valve 11. The relief canal 82 of the tie rod 20 thereby bridges the upper gasket 75. The compressed air spring force thus is reduced to zero so that only the slight force of the holding spring 77 remains. The outer closing spring 83 is then able to close the rapid closing valve 19.

Because the pilot valve 49 receives its actuating pulse from the control pressure line 50, it opens simultaneously with the rapid closing valve 19. Air therefore flows through the compressed air line 48 parallel and simultaneously with the compressed air flowing through the rapid closing valve 19 so that the air arrives downward at the same time through the pressure transducer line 51. The dynamic pressure generated by the impact of the compressed air on the surrounding soil slows the air flowing from the pressure transducer line 51 upon its exit from the compressed air outlet 13. The dynamic pressure chamber 40 is thereby very rapidly supplied with the necessary pressure so that the closing of the injection valve 11 may be effected rapidly and in a very responsive manner. By means of the compressed air coming from the pilot valve 49 and flowing through the pressure transducer line 51 from top to bottom an increase in the actuating force and valve operations absolutely free of interference may be obtained. The flow of air only cannot introduce dirt or cause clogging in the pressure transducer line 51 and the air line 39, even when dusty substrates are employed.

The second upper piston cylinder thus actuates the injection valve 11 completely independently of the actuation of the rapid closing valve 19. The pressure transducer line 51 connects the inner tube 7 of the probe pipe 8 with the upper dynamic pressure chamber 40 of the upper piston cylinder. Thereby, controlled by the process pressure, the pressure transducer line 51 effects the reliable closing and the optimum opening of the injection valve 11 in all types and conditions of soil.

The advantage obtained by the process and apparatus of the present invention is that the soil to be utilized for the cultivation of plants may be loosened better and more effectively than with conventional ploughs or the like. Substantially less energy is required than in ploughing. A further essential advantage is that with the apparatus according to the invention an optimum propping up of the ground fissures and soil cracks is obtained by the immediate introduction of a substrate. In particular, after repeated application a dense supply artery network is obtained, making it possible in a later cultivating process to perform merely a surface preparation of seed beds, so that although a highly economical and ecologically favorable working process is provided.

A further advantage of the process is that densified or otherwise diseased soils with standing cultures, for example orchards or vineyards, forests, and trees grown alongside streets, may be loosened, cured and made permeable.

Figure 5:
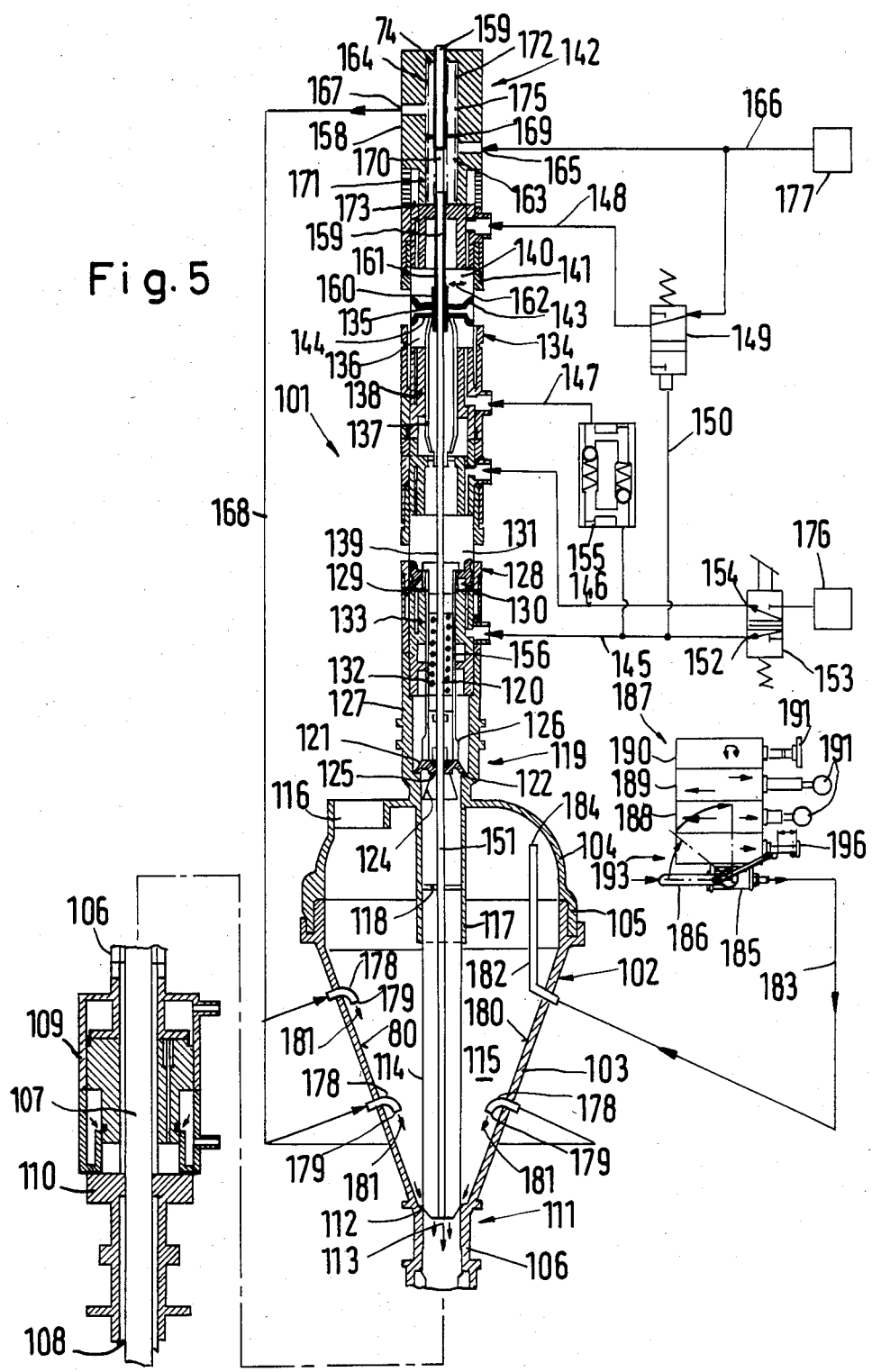
FIG. 5 shows a partially sectioned lateral view of a further embodiment of the apparatus according to the invention.
Figure 6:
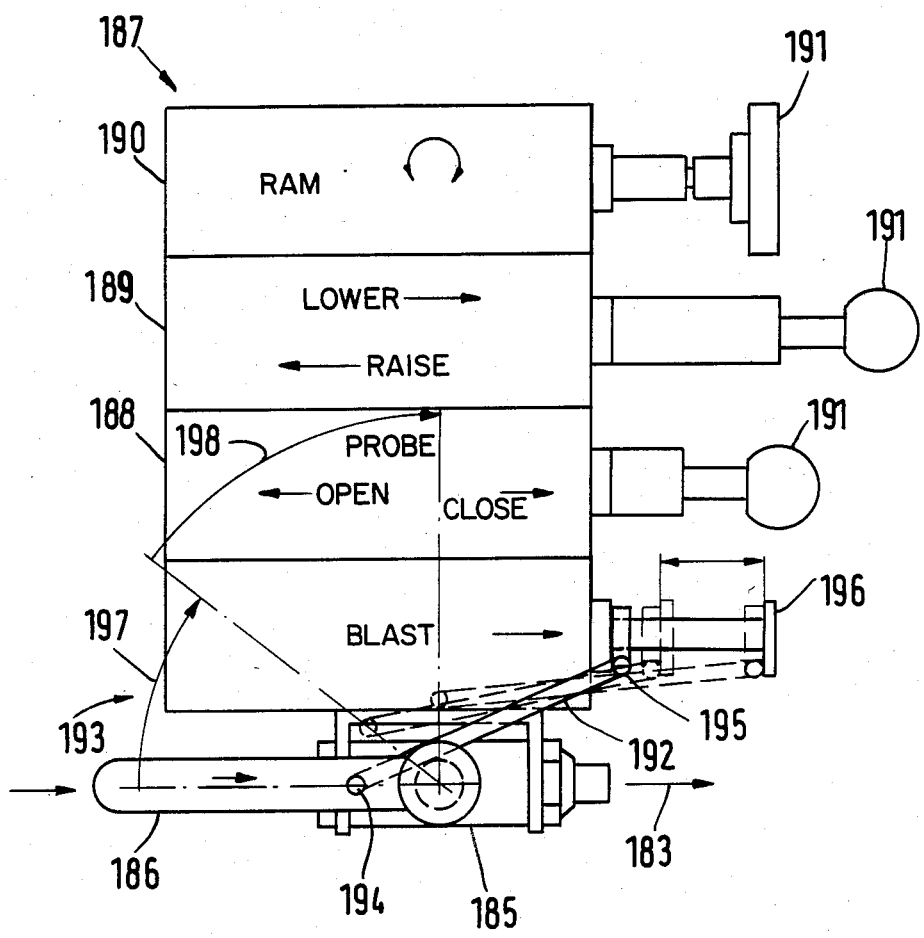
FIG. 6 shows a lateral view of the principal actuating valve block of the apparatus according to FIG. 1, enlarged.

The embodiment of the apparatus shown in FIGS. 5 and 6 corresponds in basic configuration to the apparatus 1 according to FIG. 1 to 4. The parts of the apparatus 101 identified by the symbols 102 to 141 and 143 to 155 correspond to the parts 2 to 41 and 43 to 55 of the apparatus 1 described in detail above, so that a repeated description may be omitted here. In place of the screw cap 42, however, a piston slide valve 142 is provided in the apparatus 101 and the pneumatic spring (heretofore 71) carries the symbol 156 in the apparatus 101.

The upper piston slide valve 142 comprises a housing 158 and a piston rod 159 disposed in the housing 158. The piston rod 159 is displaceable in the direction of the center axis and is connected with the tie rod 120. A threaded nut 160 is provided. The nut 160 is screwed onto a tubular part 161 protruding into the dynamic pressure chamber 140 around the hollow tie rod 120. In order to make possible the free passage of air from the dynamic pressure chamber 140 into the hollow tie rod 120, a transverse bore 162 is provided. The bore 162 is formed both in the tubular part 161 and the threaded nut 160.

An inlet chamber 163 and an outlet chamber 164 are provided in the housing 158 of the piston slide valve 142. The inlet chamber 163 comprises an air inlet 165 for the air supply 166. The outlet chamber 164 comprises an air outlet 167, to which a pressure line 168 is connected. Approximately in the center of the housing 158 there is a gasket 169 that separates the inlet chamber 163 and the outlet chamber 164 from each other. The piston rod 159 passes through the gasket 169 and is tightly surrounded by it. The piston rod 159 has a tapering part 170 in the middle of its length. The cross section of the part 170 is smaller than the cross section of the rest of the rod parts extending below and above. In the closing position of the piston slide valve 142, the upper part of the piston rod 159 is within the area of the gasket 159. The inlet chamber 163 and the outlet chamber 164 are thus tightly separated from each other. The tapered part 170 is located entirely in the area of the inlet chamber 163. In the opening position of the piston slide valve 142, the piston rod 159 is moved upward above the piston 135 and far enough so that the tapered part 170 is in the area of the gasket 169 and both in the inlet chamber 163 and the outlet chamber 164. This assures the free passage of air from the air inlet 165 through the piston slide valve 142 to the air outlet 167.

Two spacer sleeves 171, 172 are disposed coaxially and above one another in the piston slide valve 142. The lower spacer sleeve 171 is located in the inlet chamber 163 while the upper spacer sleeve 172 is positioned in the outlet chamber 164. Between the two spacer sleeves 171, 172 the gasket 169 is supported approximately in the center of the housing 158. On the opposing ends of the spacer sleeves 171, 172, i.e. in the lower terminal area of the inlet chamber 163 and in the upper terminal area of the outlet chamber 164, additional gaskets 173, 174 are arranged, which preferably have exactly the same configuration as the center gasket 169 and which again tightly surround the piston rod 159. In order to assure a high degree of tightness, even in case of very high air pressure, for example 120 bar, the gaskets 169, 173, 174 of the piston slide valve are in the form of so-called groove ring gaskets with V shaped cross sections. The gaskets 169, 173, 174 are positioned so that the opening side of the V shape is directed toward the side on which the high air pressure is applied, so that the lips extending downward in the V shape are pressured increasingly with rising pressures against the adjacent sealing surfaces. A satisfactory sealing effect is thus always ensured.

In order for the compressed air to be able to pass from the air inlet 165 to the air outlet 167, a plurality of radial air passage orifices 175 are provided in the two spacer sleeves 171, 172 in which the piston rod 159 is axially guided. To obtain satisfactory operation and optimum performance of the process, it may be advantageous to introduce the air supply 166 to the piston slide valve 142 separately from the air supply for the other parts of the apparatus. The air supply 166 could thus be supplied from a compressed air reservoir independently of the compressed air supplied to the opening 148.

A plurality of air nozzles 178 is arranged on the intermediate reservoir 102, all of which are connected with the pressure line 168 coming from the piston slide valve 142. The air nozzles 178 are located on the bottom part 103 and extend into the inner space 115. The air nozzles 178 are arranged in two different planes above one another for optimum acceleration of the substrate. The plane of the air nozzles 178 closest to the injection valve 111 is located approximately in the lower quarter of the intermediate reservoir 102. The upper plane of air nozzles 178 is located approximately in the central area of the intermediate reservoir 102. It has been found that it may be particularly advantageous to provide a total of seven or eight air nozzles 178 on the intermediate reservoir 102, e.g. four air nozzles 178 are located in the lower plane and three or four in the upper plane. In the drawing, only the air nozzles 178 arranged on the left and the right side are visible, while the rear nozzles 178 are hidden by the injector pipe 114 and the front nozzles are not seen because of the sectioned representation. The air nozzles 178 are arranged on the circumference of the intermediate reservoir 102, preferably in approximately equal intervals. It may be appropriate for certain applications to provide more or less than eight air nozzles 178, and it may be advantageous in certain conditions to place the nozzles 178 in more than one two planes. It is possible to arrange the air nozzles 178 in one plane arcuately offset with respect to the nozzles in another plane, so that the nozzles 178 of the upper plane are able to blow into the gaps existing between the nozzles 178 of the lower plane.

As seen in the drawing, the air nozzles 178 are bent approximately at right angles and arranged so that the outlet 179 is located in the vicinity of the inner surface 180 of the intermediate reservoir 102. The air nozzles 178 are aligned with their outlet 179 so that a flow of compressed air 181 exiting from the outlet 179 blows parallel to the inner surface 180 and in the direction of the compressed air outlet 113. The flow of compressed air 181 produces a high air velocity in the nozzles 178, preferably by its nearly independent high air pressure which is little affected by the actual process. This velocity is capable of accelerating the substrate particles, even if they have a high specific gravity, in the manner required. The substrate located in the reservoir 102 may be thus injected into the air flow with the injection valve 111 open, in any amount desired and entrained by the air flow, further reliably accelerated if necessary, for delivery into the opened soil and distributed in the most favorable manner possible.

At the instant the soil is broken up, pressure declines over the entire process path. The abrupt pressure decrease in the dynamic pressure chamber 140 opens the injection valve 111. At the instant the injection valve 111 opens, the piston slide valve 142 is also opened by the necessary upward movement of the piston rod 159, so that the air supply 166 passes into the pressure line 168 and to the air nozzles 178. The flow of compressed air 181 exiting from the air nozzles 178 entrains the substrate in the reservoir 102 with a high velocity and acts against the counter pressure resulting upon the opening of the injection valve 111. In the intermediate reservoir 102, the flow 181 of compressed air produces a pressure level that forces the substrate to flow downward out of the reservoir 102 immediately upon the opening of the injection valve 111. The substrate particles are thus accelerated by the eight air nozzles 178 into the injection stream. The injection jet transports the substrate particles precisely during the most efficient initial phase of the substrate insertion.

The substrate is transported under a high pressure and with great velocity into the farthest and smallest fissures and cracks of the newly broken soil. The permeation of the soil volume is thereby significantly improved, and the propping substrate, which can comprise fertilizers or curing substances for example, are carried into the soil with an equal or reduced consumption of energy and with an optimum distribution of the substances. These improvements are especially important for the restoration of all environmentally damaged stands of trees, for example in public parks, road side greenery and in forests.

According to a further feature of the invention, it may be advantageous for the optimum penetration and propping of the broken soil volume, preferably under a high air pressure and particularly at a high air velocity, to provide an air inlet 182 opening into the inner space 115 of the intermediate reservoir 102. The air inlet 182 is connected to air pressure line 183 and is intended to produce an over-pressure prior to the opening of the injection valve 111 and thus prior to the opening of the rapid closing valve 119 for blasting compressed air into the soil. The overpressure is produced in the intermediate reservoir 102 and applied to the substrate in the reservoir 102 in the direction of the compressed air outlet 113.

As seen in FIG. 5, the air inlet 182 passes through the wall of the reservoir 102 approximately in its central area and extends in the form of a bent pipe in an upward direction to the cover wall of the upper part 104, so that the air outlet 184 is located above the substrate even if the reservoir 102 is full. The overpressure in the intermediate reservoir 102 is able to cooperate with the flow 181 of compressed air of the air nozzles 178, thereby transporting the substrate more effectively toward the compressed air outlet 113. The overpressure may also be provided without the flow 181 of the nozzles 178 and used to effect the accelerated exit of the substrate according to the process of the present invention.

The overpressure produced by the air inlet 182 in the intermediate reservoir 102 prior to the breakup of the soil is at least high enough to equalize the counter pressure resulting upon opening of the injection valve 111. The counter pressure originates in the inner tube 107 and acts in the direction of the inner space 115 of the reservoir 102. Because of the equalization of pressure, the counter pressure from the inner tube 107 thus cannot act in the inner space 115. Rather, the substrate is pressured directly into the flow of compressed air 113 by the overpressure. The exposure of the substrate to the overpressure is effected conveniently shortly prior to the opening of the injection valve 111. The abrupt introduction of the compressed air into the soil is actuated immediately following the attainment of the overpressure.

The air pressure introduced through the over-pressure line 183 should correspond at least to the jet pressure generated by the opening of the injection pipe 114. According to experience, this amounts to between 2 and 3 bar. In special cases it may, however, be much higher.

The compressed air for the buildup of the over-pressure in the intermediate reservoir 102 is controlled by a ball valve 185 located in the over-pressure line 183. As is seen in FIG. 6, the ball valve 185 is equipped with an actuating lever 186 for manual operation. The ball valve 185 is located on a compact valve block 187. The valve block comprises the distributing valve 153 serving to break up the soil, a valve 188 to open and close the probe tube 108, a valve 189 provided for the raising and lowering of the probe apparatus with the aid of two lift cylinders, for example, and a valve 190 for the actuation of the ram 109. The valves 188, 189 and 190 have appropriate handles 191 for their actuation.

The distributing valve 153 is coupled with the ball valve 185 by means of a linkage 192 so that a slave valve 193 is obtained. The linkage 192 is therefore attached with one end 194 to the actuating lever 186 and with its other end 195 to an opener 196 of the 5/2 distributing valve 153.

When the actuating lever 186 is pivoted upward in the direction of the arrow by approximately 45° corresponding to a first opening path 197, the ball valve 185 is opened far enough so that compressed air flows through the overpressure line 183 and the air inlet 182 into the inner space 115 of the intermediate reservoir 102, until the necessary overpressure is built up in the inner space 115. In this first opening path 197 the opener 196 of the 5/2 distributing valve 153, which preferably is in the form of a piston slide, remains in its closed position. If now the actuating lever 186 is pivoted further upwardly over a second opening path 198 approximately to the vertical in the direction of the arrow, the ball valve 185 is opened further, and, simultaneously, the opener 196 is displaced to the right in the drawing by the linkage 192. The distributing valve 153 is now also opened, whereupon the pressure blast is initiated to break up the soil. Following the introduction of the substrate into the broken soil the actuating lever 186 is pivoted back into the initial position shown, so that the ball valve 185 is closed. In the process, the opener 196 may also be forcibly entrained to the left by means of the linkage 192 to close the distributing valve 153. In another preferred embodiment, the opener 196 may be pressured, for example by the force of a spring, to the left into the closing position.

The air supply for the ball valve 185 may be provided from a separate compressed air reservoir, not shown, and optimized by means of pressure reducers.

In view of the overpressure built up prior to the opening of the injection valve 111 in the intermediate reservoir 102 the counter pressure originating in the air jet 113 cannot act in the direction of the inner space 115. No air movement can thus take place from the air jet into the intermediate reservoir 102. Consequently, the substrate, especially heavy substrates, may be mixed without delay immediately following the breaking of the soil into the air jet 113 and inserted into the soil.

What is claimed is:

1. A method for breaking up and introducing substrate into soil used for the cultivation of plants, comprising the steps of:
    opening a rapid-closing valve;
    introducing a blast of compressed air into the soil with a probe and breaking up the soil when the rapid-closing valve is opened;
    introducing additional compressed air into a third chamber of a second cylinder and the probe simultaneously with the opening of the rapid-closing valve;
    sensing a pressure drop in the third chamber following the blast;
    opening an injection valve in response to the pressure drop, and
    injecting a substrate into interstices in the soil caused by the blast, when the injection valve is opened.

2. A method as recited in claim 1, wherein said blast and said additional compressed air are introduced into said probe by separate lines.

3. A method as recited in claim 1, wherein the additional compressed air introduced into the third chamber serves to keep the injection valve closed by acting on a second piston which is axially displaceable in the second cylinder, and wherein the method further comprises the step of introducing compressed air into a fourth chamber in the second cylinder when the pressure in the third chamber has reached a level sufficient for closing the injection valve, and wherein said step of serving comprises opening the injection valve by a displacement of the second piston effected when the pressure in the fourth chamber exceeds the pressure in the third chamber.

4. A method as recited in claim 3, further comprising the step of accelerating a substrate out of a substrate reservoir with a compressed air stream when the injection valve is opened, wherein the compressed air stream is produced in response to the pressure drop in the third chamber.

5. A method as recited in claim 4, further comprising the step of producing a positive pressure in the substrate reservoir directly before said blast, the positive pressure serving to counter balance the pressure created in the probe.

6. An apparatus for breaking up and introducing substrate into soil used for the cultivation of plants, comprising:
    a probe for insertion into the soil;
    an inner tube associated with the probe;
    a substrate reservoir for containing substrate, said reservoir defining a space surrounding a first section of the inner tube and including an inner wall, a top portion, a bottom portion and a central axis;
    a rapid-closing valve for regulating a flow of air from a compressed air source into the inner tube, said rapid-closing valve being disposed adjacent the top portion of the substrate reservoir;
    a first cylinder for controlling the opening and closing of the rapid-closing valve, and disposed above the top portion of the reservoir;
    a first piston mounted for axially displaceable movement in the first cylinder and defining first and second chambers within the first cylinder, said piston being connected with the rapid-closing valve;
    an injection valve for controlling the flow of substrate from the substrate reservoir to said inner tube, and disposed substantially near the bottom portion of the substrate reservoir;
    an axially displaceable injector pipe disposed in the substrate reservoir and connected with the injection valve;
    a second cylinder for controlling the opening and closing of the injection valve, and disposed above the first cylinder;
    a second piston mounted for axially displaceable movement in the second cylinder and defining third and fourth chambers within the second cylinder, said second piston being connected with the injection valve;
    means for communicating air under pressure to said inner tube and said third chamber;
    means for controlling the first and second cylinders, and
    a source of compressed air connected with the third chamber for injecting air into the soil.

7. An apparatus as recited in claim 6 wherein said means for communicating comprises a hollow tie rod for connecting the second piston with the injector pipe, and wherein said tie rod includes a first orifice communicating with the third chamber and a second orifice communicating with said inner tube.

8. An apparatus as recited in claim 7, wherein said means for controlling comprises a first control pressure line connected with the first chamber, a second control pressure line connected with the second chamber, a fourth control pressure line connected with the fourth chamber, a pilot valve for connecting said source of compressed air with the third chamber, and a fifth control pressure line for actuating the pilot valve.

9. An apparatus as recited in claim 8, wherein said fifth pressure line is connected with said second pressure line and said fourth pressure line; and further comprising a 5/2 distributing valve having a first position supplying control pressure to said first control pressure line, and a second position supplying control pressure to said second, fourth and fifth lines.

10. An apparatus as recited in claim 7, wherein said means for communicating comprises a pressure transducer line connected to said tie rod and extending at least into the first section of the inner tube.

11. An apparatus as recited in claim 10, wherein the injection valve comprises a valve cone disposed on the injector pipe and a valve seat disposed in the bottom portion of said substrate reservoir, and wherein said transducer line extends substantially to said valve seat.

12. An apparatus as recited in claim 9, further comprising a time valve disposed in the fourth control pressure line for optionally adjusting the timing of presure buildup in said fourth chamber, and wherein said time valve comprises a valve body, adjustable spring means for biasing the valve body to block said control pressure, a valve part, and spring means for biasing the valve part to block return flow.

13. An apparatus as recited in claim 7, wherein the first piston comprises a piston rod, wherein the rapid-closing valve comprises a valve cone disposed on piston rod and a valve seat disposed in said top portion of the substrate reservoir; wherein the piston rod includes a pneumatic spring assembly for closing the rapid-closing valve, and wherein said tie rod passes through the pneumatic spring assembly and the rapid-closing valve.

14. An apparatus as recited in claim 13, wherein the pneumatic spring assembly further comprises:
 a fifth chamber disposed in the piston rod, defined by a top, a bottom, a chamber wall and said tie rod, and having a third orifice communicating with said first chamber;
 a third piston disposed on the hollow tie rod;
 a first gasket disposed on the top of the fifth chamber having a V-shaped cross section and functioning as a check valve to close the third orifice, said first gasket having a concave side facing away from the orifice;
 a second gasket disposed on a side of the third piston facing the third orifice and having a V-shaped cross section, said second gasket having a concave side facing the orifice; and
 a holding spring disposed around the tie rod and between the first and second gaskets for biasing the first gasket against the second gasket.

15. An apparatus as recited in claim 7, further comprising a plurality of compressed air nozzles opening into said inner space of the substrate reservoir, for introducing compressed air into the substrate reservoir and for accelerating the exit of substrate from said injection valve.

16. An apparatus as recited in claim 15, where said plurality of nozzles are constructed and arranged so as to introduce compressed air substantially parallel to said inner wall of the substrate reservoir.

17. An apparatus as recited in claim 15, wherein said plurality of nozzles comprises a first set of nozzles arranged in a first plane disposed at an axial distance of approximately one quarter of the distance between the bottom and the top of the reservoir, and a second set of nozzles arranged in a second plane disposed at an axial distance substantially half-way between the top and the bottom of the substrate reservoir.

18. An apparatus as recited in claim 15, further comprising a substrate compressed air line for supplying the nozzles with compressed air, and a sixth valve operatively connected with the tie rod and movable to an open position for supplying air to the nozzles when said injection valve is open.

19. An apparatus as recited in claim 18, wherein said sixth valve comprises a housing arranged coaxially with said second cylinder, and a piston rod for opening and closing the sixth valve, said piston rod being connected to said tie rod.

20. An apparatus as recited in claim 19, wherein said sixth valve further comprises:
 an inlet chamber having an air inlet;
 an outlet chamber having an air outlet connected to said substrate line;
 a third gasket disposed in the housing surrounding and sealing the piston rod and separating the inlet and outlet chambers,
  wherein the piston rod is formed with a tapered portion which bridges the third gasket and allows compressed air to pass from the inlet chamber to the outlet chamber when the sixth valve is in said open position, and wherein the tapered portion is entirely disposed in the inlet chamber when the sixth valve is in a closed position.

21. An apparatus as recited in claim 9, further comprising a substrate reservoir air inlet for introducing compressed air into an upper part of said substrate reservoir above a level of substrate, and a second compressed air line connected with the substrate inlet.

22. An apparatus as recited in claim 21, further comprising:
 a slave valve for connecting the second compressed air line with said 5/2 distributing valve;
 a manually operable actuating lever for actuating the slave valve, said lever being movable between first and second opening paths, and
 a linkage for connecting the slave valve with the distributing valve;
  wherein, when the lever is moved in the first opening path, air under pressure is introduced by said reservoir inlet, and when the lever is moved in the second opening path, the distributing valve is moved to the second position.

* * * * *